US010159950B2

(12) United States Patent
Risbjerg Jarlkov et al.

(10) Patent No.: US 10,159,950 B2
(45) Date of Patent: Dec. 25, 2018

(54) PARTICLE SEPARATING CATALYTIC CHEMICAL REACTOR AND PARTICLE SEPARATOR

(71) Applicant: Haldor Topsøe A/S, Kgs. Lyngby (DK)

(72) Inventors: Klaus Risbjerg Jarlkov, Kgs. Lyngby (DK); Emir Zahirovic, Copenhagen NV (DK)

(73) Assignee: HALDOR TOPSØE AS, Kgs. Lyngby (DK)

( * ) Notice: Subject to any disclaimer, the term of this patent is extended or adjusted under 35 U.S.C. 154(b) by 0 days.

(21) Appl. No.: 15/527,952

(22) PCT Filed: Dec. 18, 2015

(86) PCT No.: PCT/EP2015/080406
§ 371 (c)(1),
(2) Date: May 18, 2017

(87) PCT Pub. No.: WO2016/102342
PCT Pub. Date: Jun. 30, 2016

(65) Prior Publication Data
US 2017/0326518 A1    Nov. 16, 2017

(30) Foreign Application Priority Data

Dec. 23, 2014  (IN) ............................ 3873/DEL/2014
Feb. 17, 2015  (EP) ..................................... 15155379

(51) Int. Cl.
*B01J 8/00* (2006.01)
*C10G 67/02* (2006.01)
(Continued)

(52) U.S. Cl.
CPC ............. *B01J 8/0065* (2013.01); *B01J 4/002* (2013.01); *B01J 4/005* (2013.01); *B01J 8/0085* (2013.01);
(Continued)

(58) Field of Classification Search
CPC ........ B01J 4/002; B01J 8/0065; B01J 8/0085; B01J 8/0492; C10G 49/002; C10G 67/02
(Continued)

(56) References Cited

U.S. PATENT DOCUMENTS 1,442,689 A * 1/1923 Loss ...................... B01D 45/08
                                                      55/463
4,664,888 A   5/1987 Castagnos, Jr.
(Continued)

FOREIGN PATENT DOCUMENTS

AU           620129 B2    2/1992
EP         0 222 436 A2   5/1987
(Continued)

OTHER PUBLICATIONS

International Search Report with Written Opinion corresponding to International Patent Application No. PCT/EP2015/080012, dated Apr. 1, 2016.
(Continued)

*Primary Examiner* — Huy Tram Nguyen
(74) *Attorney, Agent, or Firm* — Leydig, Voit & Mayer, Ltd.

(57) ABSTRACT

A catalytic reactor comprises a particle separator which extracts particles from the fluid flow stream above the reactor internals by means which makes the fluid flow stream perform a radial outwards and upwards S-curve flow path, which enables the particles to be extracted and settle in a collection section with low flow activity and turbulence.

14 Claims, 2 Drawing Sheets

(51) Int. Cl.
  *B01J 4/00*  (2006.01)
  *C10G 49/00*  (2006.01)
  *B01J 8/04*  (2006.01)
  *B01J 8/02*  (2006.01)

(52) U.S. Cl.
  CPC ........... *B01J 8/0278* (2013.01); *B01J 8/0492* (2013.01); *C10G 49/002* (2013.01); *C10G 67/02* (2013.01); *B01J 2208/00761* (2013.01); *B01J 2208/00902* (2013.01); *B01J 2219/00247* (2013.01)

(58) Field of Classification Search
  USPC ................ 422/212, 196, 195, 197, 215, 220
  See application file for complete search history.

(56) References Cited

U.S. PATENT DOCUMENTS

| | | | |
|---|---|---|---|
| 5,346,631 A | * | 9/1994 | Terry ..................... B01D 45/00 210/519 |
| 7,250,142 B2 | * | 7/2007 | Boyer ................... B01D 53/185 208/210 |
| 2004/0086435 A1 | | 5/2004 | Boyer et al. |
| 2009/0177023 A1 | | 7/2009 | Koudil et al. |
| 2014/0231309 A1 | | 8/2014 | Bazer-Bachi et al. |

FOREIGN PATENT DOCUMENTS

| | | |
|---|---|---|
| EP | 0 358 923 A1 | 3/1990 |
| EP | 1 382 376 A1 | 1/2004 |
| GB | 862214 A | 3/1961 |
| WO | WO 2013/045770 A1 | 4/2013 |
| WO | WO 2016/102270 A1 | 6/2016 |

OTHER PUBLICATIONS

International Search Report with Written Opinion corresponding to International Patent Application No. PCT/EP2015/080406, dated Mar. 1, 2016.

* cited by examiner

PARTICLE SEPARATING CATALYTIC CHEMICAL REACTOR AND PARTICLE SEPARATOR

CROSS-REFERENCE TO RELATED APPLICATIONS

This application is a U.S. National Stage Application filed under 35 U.S.C. § 371 of International Application No. PCT/EP2015/080406, filed Dec. 18, 2015, which claims the benefit of Indian Application No. 3873/DEL/2014, filed Dec. 23, 2014, and EP Application No. 15155379.9, filed Feb. 17, 2015. All of these applications are hereby incorporated by reference in their entireties.

FIELD OF THE INVENTION

This invention relates to a catalytic chemical reactor with particle separation. More specifically the invention relates to a reactor with a particle separator which uses a sedimentation principle which is independent of the particles location in the inlet fluid stream. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Particle separation and classification are well explored need of the chemical, pharmaceutical, mineral and food industries. While particle classification in industrial processes may be required to improve the quality of a certain product, particle separation may be necessary to purify a fluid stream or to avoid problems to process equipment.

Sometimes particles are intentionally present in the process stream. This is for example the case of combustion processes based on pulverised fuels or production of pharmaceutical or specialty chemicals using powder technology. In other cases the presence of particles is unintentional. This is for example the case of some refineries streams, effluents from fluidized beds, product streams from Fischer Tröpsch reactors. Particles may have various origins: they may be part of the original feedstock and other reactant streams or they may be generated in and collected from process equipment, for example as erosion products. Particles may be solid or liquid, may have organic nature, like char, coke and gums, or inorganic nature, like salts, debris or corrosion and erosion as iron components, or debris of catalyst particles. They may be liquid, as some aqueous mists, and containing living impurities as bacteria. Shape and size may also vary greatly—from sphere to flakes, from millimeters to a few microns or less. If the particles are unwanted in the downstream process, often, a filter, or other suitable particle separation technology known in the art, removes large part of these particles prior to sensitive equipment. However, in certain processes, the problem may appear or become more severe over time, for example when erosion and corrosion are involved. Sometimes, installing a particle removing equipment as an independent unit operation prior to sensitive equipment is not possible in practice.

One specific example of problems generated by particles may be seen in naphtha hydrotreating. The feed to a hydrotreating reactor is sometimes laden with particles. When the particle laden feed is introduced into the hydrotreating reactor the particles tend to scale rapidly on the grading or the catalyst. Reactors may thus require frequent skimming of the affected layers of the bed to contain the pressure drop build-up in the reactor. A frequency of once every 5-6 months or even of once every 2-3 months for skimming is not uncommon.

A characterization of the particles affecting a naphtha hydrotreater is seldom available. In fact the particles depend upon the naphtha feedstock or process related issues (rust, salts, gums, etc.). On-stream collection of the particles is typically not available. Thus, particle characterization relies on post-mortem analyses, which are affected by large uncertainties due to particle agglomeration and oxidation.

Similarly, process gas resulting from the regeneration of FCC (fluid catalytic cracking) catalyst is often laden with catalyst particles and catalyst debris. Such gas may be conveyed to a sulphur recovery unit, most commonly a Claus plant, for the recovery as elemental sulphur, or a WSA plant, for the recovery of sulphur as concentrated sulphuric acid. These are catalytic fixed bed reactors which are prone to plugging if exposed to a particle-laden feedstock. The particles commonly present at the exit of the FCC regenerator is generally in the 2-20 micron size range or below.

US2009177023 discloses a filtration tray for a fixed bed reactor with a co-current down-flow of gas and liquid. The device can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

EP0358923 discloses a process and an apparatus for purifying a raw gas originating from the gasification of solids. In a process and apparatus for purifying raw gas from solids gasification, containing granular and dusty solids particles, a solution is to be found, by means of which solids particles of any size are largely removed from the raw gas before entry to downstream cooling devices. This is achieved when the raw gas is passed in a first purification stage from the gasification zone in a straight line in the direction of a gas-holding space, whereby the granular solids particles are precipitated at the bottom of the gas-holding space and then, in a second purification stage, the partially purified raw gas is laterally deflected from the gas-holding space and undergoes a change to a velocity reduced by a factor of at least 3 and, after a further gas deflection, is passed substantially in the vertical direction through a solids filter, where the dusty solids particles are removed from the raw gas.

In spite of the above mentioned known art, a need exists for a reactor with a particle separator to ensure prolonged effective operation of the reactor despite any particle impurities in the inlet fluid stream to the reactor.

SUMMARY OF THE INVENTION

The present invention describes a novel catalytic chemical reactor comprising a particle separation system.

According to the invention, particles are separated from a flowing fluid stream by trapping them in a sedimentation region. Trapping of the particles is obtained by applying an S-shaped flow to the fluid stream in the particle separator. When the fluid stream performs the S-curved flow path, the particles may be flung outwards and by gravity downwards, and settle in a part of the separator with low fluid flow activity.

FEATURES OF THE INVENTION

1. Particle separating catalytic reactor for chemical reactions, comprising a particle separator for separating particles from the inlet fluid stream to the reactor, said particle separator comprises a base plate, at least one inlet channel comprising an inlet channel exit, at least one fluid stream diverter, at least one collection section, at least one transfer chimney comprising a transfer chimney inlet located above the base plate and a transfer chimney outlet located below the base plate, wherein each of the at least one inlet channel exits faces one of the at least one fluid stream diverters and the at least one fluid stream diverters is positioned in a level below the at least one transfer chimney inlets.

2. Particle separating catalytic reactor according to feature 1, comprising one inlet channel, one inlet channel exit, one fluid stream diverter and a plurality of transfer chimneys.

3. Particle separating catalytic reactor according to feature 1, comprising one inlet channel, one inlet channel exit, one fluid stream diverter and a plurality of transfer chimneys.

4. Particle separating catalytic reactor according to any of the preceding features, wherein the at least one inlet channel has a circular cross section and the at least one fluid stream diverter has a concave shape.

5. Particle separating catalytic reactor according to any of the preceding features, wherein the base plate has a circular shape and the at least one inlet channel exit is located above the centre of the base plate, the at least one fluid stream diverter is located in fixed connection to and in the centre of the on the upper side of the base plate and the at least one transfer chimneys are located in fixed connection to, and in the periphery of the base plate.

6. Particle separating catalytic reactor according to feature 5, wherein the at least one transfer chimneys are mounted at an inwards angle relative to vertical on the base plate.

7. Particle separating catalytic reactor according to any of the preceding features, wherein the at least one transfer chimney inlets are facing away from the at least one inlet channel exit and the at least one fluid stream diverter.

8. Particle separating catalytic reactor according to any of the preceding features, wherein the at least one fluid stream diverter has a circular shape.

9. Particle separating catalytic reactor according to any of the preceding features, wherein said catalytic reactor is a hydroprocessing reactor.

10. Particle separating catalytic reactor according to any of the preceding features, wherein the reactor has a dome shaped upper part, the base plate is located beneath or within the lower part of the dome, the particle separator is located within the dome, the at least one inlet channel exit is located near the bottom of the dome relative to the at least one transfer chimney inlet and the at least one transfer chimney inlet is located near the top of the dome relative to the at least one inlet channel exit.

11. Particle separating catalytic reactor according to any of the preceding features, further comprising a flow conditioner arranged within the inlet channel to ensure plug flow of the inlet fluid stream.

12. Particle separating catalytic reactor according to feature 11, wherein the flow conditioner is cone shaped and arranged concentric with the inlet channel with the pointed end of the cone upwards, against the inlet fluid stream.

13. Particle separating catalytic reactor according to any of the preceding features, further comprising at least one inlet channel exit flow divider, dividing the exit flow in a plurality of outlet channels to ensure low flow velocity of the fluid flow exiting the inlet channel.

14. Particle separating catalytic reactor according to feature 13, wherein the inlet channel exit flow dividers are conical shaped and said plurality of outlet channels have equal inlet areas.

BRIEF DESCRIPTION OF THE DRAWINGS

The invention is further illustrated by the accompanying drawings showing examples of embodiments of the invention.

POSITION NUMBERS

01. Particle separator.
02. Base plate
03. Inlet channel.
04. Inlet channel exit.
05. Fluid stream diverter.
06. Collection section.
07. Transfer chimney.
08. Transfer chimney inlet.
09. Transfer chimney outlet.
10. Inlet channel flow conditioner.
11. Inlet channel exit flow divider.

DESCRIPTION OF THE DRAWINGS

Figure 1:
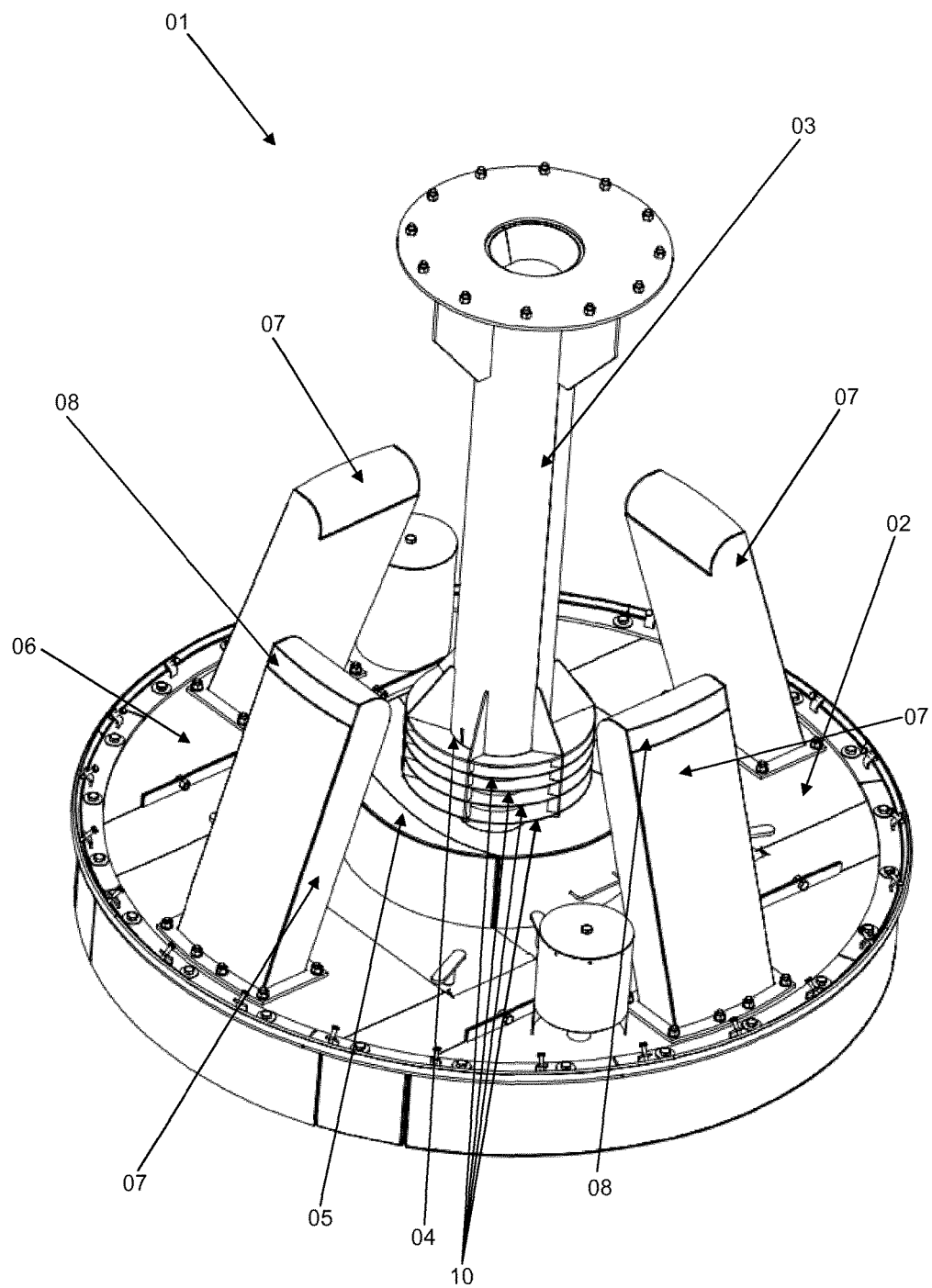
FIG. 1 shows an isometric view of a particle separator for a catalytic chemical reactor (not shown) according to an embodiment of the invention.
Figure 2:
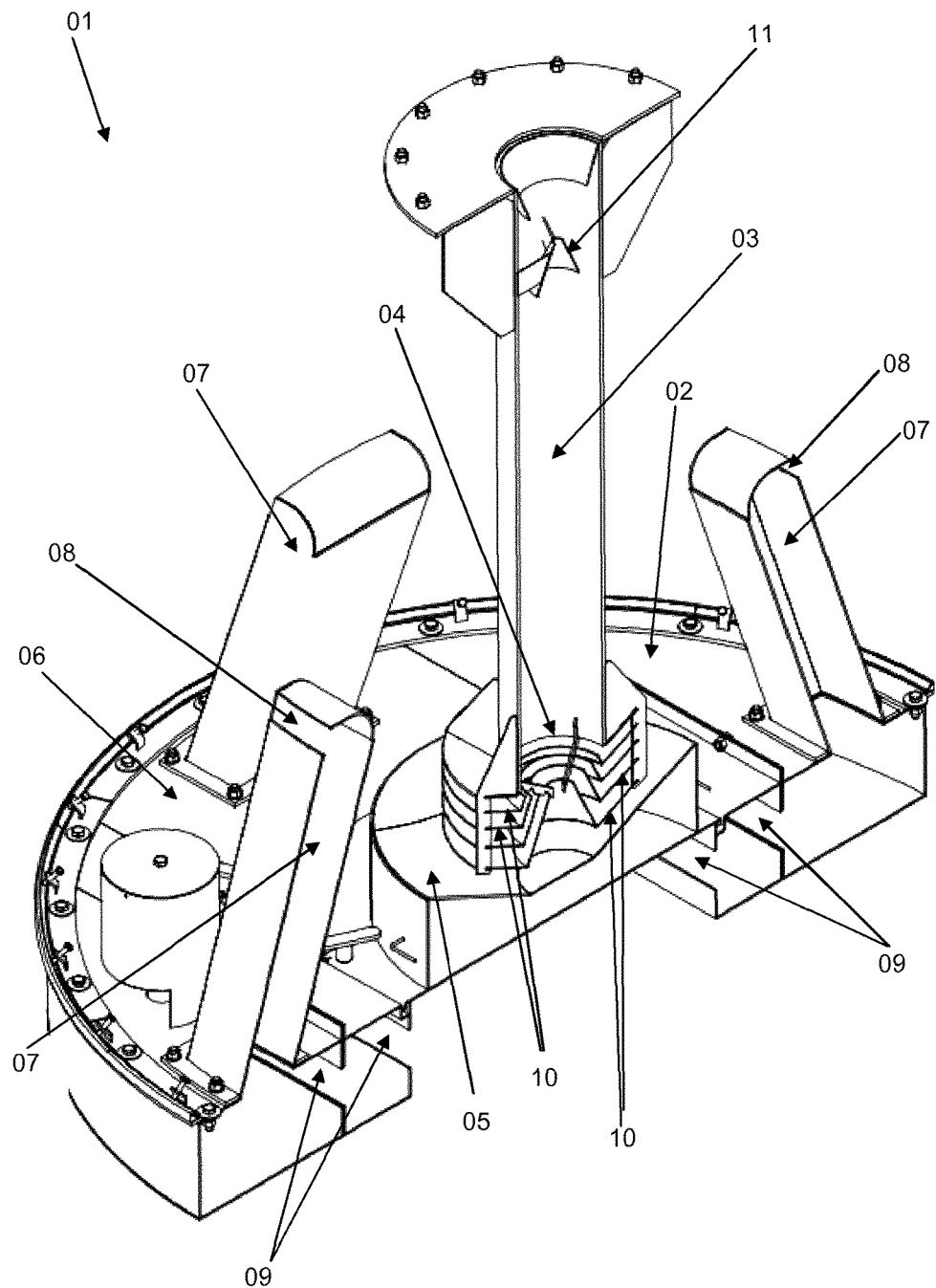
FIG. 2 shows an isometric side cut view of the particle separator for a catalytic chemical reactor (not shown) according to an embodiment of the invention.

Embodiments of the invention will be explained in more detail in the following with reference to the drawings as seen on FIG. 1 and FIG. 2.

A catalytic reactor (not shown) comprises a hollow top compartment where process gas enters. In this hollow space a particle separator 01 may be installed, providing the feature of particle separation to the process without demanding extra space added to the reactor. The particle separator comprises a base plate 02, which in this embodiment is the existing top plate of the reactor. The process gas enters the reactor via the inlet channel 03 and passes out into the top part of the reactor, which in this case is also the particle separator, through the inlet channel exit 04. In an embodiment to the invention, the particle separating catalytic reactor comprises a flow conditioner 11 arranged within the inlet channel to ensure plug flow of the inlet fluid stream.

The flow conditioner may be cone shaped and arranged concentric with the inlet channel with the pointed end of the cone upwards, against the inlet fluid stream.

The process fluid stream has a downwards flow direction when it exits from the inlet channel. Beneath the inlet channel exit, the process fluid stream next meets the fluid stream diverter 05, which is located on and in the center of the base plate. The fluid stream diverter has a concave shape and a circular outer rim with a diameter larger than the diameter of the inlet channel exit. Therefore when the fluid stream flows downwards and meets the center portion of the fluid stream diverter, the flow is diverted in a radial outwards and upwards direction evenly distributed around the entire circular area of the fluid stream diverter and further out to the collection section 06 of the particle separator. In an embodiment of the invention, the base plate itself may act as fluid stream diverter, in which case the need for a particular fluid stream diverter plate is omitted. In another embodiment of the invention, at least one inlet channel exit flow divider 10 is arranged at the exit of the inlet channel, dividing the exit flow in a plurality of outlet channels to ensure low flow velocity of the fluid flow exiting the inlet channel. The inlet channel exit flow dividers may be conical shaped and arranged so the pluralities of outlet channels have equal inlet areas.

The collection section is the entire area above the base plate and within the hollow top compartment of the reactor, except for the area occupied by the fluid stream diverter and the transfer chimneys 07.

The particle separator comprises four transfer chimneys evenly arranged on the outer area of the base plate. The chimneys rise upwards in an angle inwards towards the centre axis of the particle separator relative to vertical. A transfer chimney inlet 08 is positioned near the top on each of the transfer chimneys facing away from the inlet channel exit. The transfer chimneys serve the purpose of positioning the product fluid flow outlet from the particle separator substantially above the inlet channel exit and in a position which forces the fluid flow stream to perform an S-curve from the inlet channel exit to the transfer chimney inlet. During this flow, the particles which are in the fluid flow stream may due to their density be slung out of the S-curved fluid flow stream and settle in an area of the collection section which has a low flow activity or turbulence. This will to a large part be on the part of the base plate which is near the outer periphery of the particle separator. As the fluid flow exits the inlet channel exit, the flow is spreading out in a radial direction to a much larger area than the cross sectional area of the inlet channel. Thus the flow speed decreases and the entrainment of particles in the fluid flow stream is reduced.

Furthermore, the fluid flow stream upward motion also contributes to an effective separation of particles from the stream. Thus the design and the position of the inlet channel exit relative to the transfer chimney inlets ensures that particles are separated from the fluid flow stream and settled in the collection section for removal during maintenance.

After particle separation is performed, the process gas is led for further processing in the reactor below the base plate via the transfer chimneys and out through the transfer chimney outlets 09.

The invention claimed is:

1. Particle separating catalytic reactor for chemical reactions, comprising a particle separator for separating particles from the inlet fluid stream to the reactor, said particle separator comprises a base plate, at least one inlet channel comprising an inlet channel exit, at least one fluid stream diverter, at least one collection section, at least one transfer chimney comprising a transfer chimney inlet located above the base plate and a transfer chimney outlet located below the base plate, wherein each of the at least one inlet channel exits faces one of the at least one fluid stream diverters and the at least one fluid stream diverters is positioned in a level below the transfer chimney inlet of the at least one transfer chimney, and wherein the at least one fluid stream diverter has a concave shape.

2. Particle separating catalytic reactor according to claim 1, comprising one inlet channel, one inlet channel exit, one fluid stream diverter and a plurality of transfer chimneys.

3. Particle separating catalytic reactor according to claim 1, wherein the base plate is adapted to act also as fluid stream diverter.

4. Particle separating catalytic reactor according to claim 1, wherein the at least one inlet channel has a circular cross section.

5. Particle separating catalytic reactor according to claim 1, wherein the base plate has a circular shape and the at least one inlet channel exit is located above the centre of the base plate, the at least one fluid stream diverter is located in fixed connection to and in the centre of the on the upper side of the base plate and the at least one transfer chimneys are located in fixed connection to, and in the periphery of the base plate.

6. Particle separating catalytic reactor according to claim 5, wherein the at least one transfer chimneys are mounted at an inwards angle relative to vertical on the base plate.

7. Particle separating catalytic reactor according to claim 1, wherein the at least one transfer chimney inlets are facing away from the at least one inlet channel exit and the at least one fluid stream diverter.

8. Particle separating catalytic reactor according to claim 1, wherein the at least one fluid stream diverter has a circular shape.

9. Particle separating catalytic reactor according to claim 1, wherein said catalytic reactor is a hydroprocessing reactor.

10. Particle separating catalytic reactor according to claim 1, wherein the reactor has a dome shaped upper part, the base plate is located beneath or within the lower part of the dome, the particle separator is located within the dome, the at least one inlet channel exit is located near the bottom of the dome relative to the at least one transfer chimney inlet and the at least one transfer chimney inlet is located near the top of the dome relative to the at least one inlet channel exit.

11. Particle separating catalytic reactor according to claim 1, further comprising a flow conditioner arranged within the inlet channel to ensure plug flow of the inlet fluid stream.

12. Particle separating catalytic reactor according to claim 11, wherein the flow conditioner is cone shaped and arranged concentric with the inlet channel with the pointed end of the cone upwards, against the inlet fluid stream.

13. Particle separating catalytic reactor according to claim 1, further comprising at least one inlet channel exit flow divider, dividing the exit flow in a plurality of outlet channels to ensure low flow velocity of the fluid flow exiting the inlet channel.

14. Particle separating catalytic reactor according to claim 13, wherein the inlet channel exit flow dividers are conical shaped and said plurality of outlet channels have equal inlet areas.

* * * * *